US012396466B2

(12) United States Patent
Henley et al.

(10) Patent No.: US 12,396,466 B2
(45) Date of Patent: Aug. 26, 2025

(54) REMOVAL OF INSOLUBLES FROM AQUEOUS STREAMS USED IN FOOD PROCESSING

(71) Applicant: SAFE FOODS CORPORATION, North Little Rock, AR (US)

(72) Inventors: Jason Henley, Searcy, AR (US); Steve Huff, Sherwood, AR (US); Todd Coleman, Batesville, AR (US)

(73) Assignee: Safe Foods Corporation, North Little Rock, AR (US)

(*) Notice: Subject to any disclaimer, the term of this patent is extended or adjusted under 35 U.S.C. 154(b) by 0 days.

(21) Appl. No.: 18/405,669

(22) Filed: Jan. 5, 2024

(65) Prior Publication Data
US 2024/0156114 A1 May 16, 2024

Related U.S. Application Data

(62) Division of application No. 17/759,477, filed as application No. PCT/US2021/015649 on Jan. 29, 2021, now Pat. No. 11,918,002.

(Continued)

(51) Int. Cl.
A22B 5/08 (2006.01)
A22C 17/08 (2006.01)
(Continued)

(52) U.S. Cl.
CPC ............... A22C 17/08 (2013.01); A22B 5/08 (2013.01); A22C 21/0061 (2013.01);
(Continued)

(58) Field of Classification Search
CPC ......... A22B 5/0082; A22B 5/08; A22C 17/08; A22C 21/0061; A22C 21/04;
(Continued)

(56) References Cited

U.S. PATENT DOCUMENTS 4,852,215 A 8/1989 Covell, III
5,605,503 A 2/1997 Martin
(Continued)

FOREIGN PATENT DOCUMENTS

CN 101445296 A 6/2009
CN 101921044 A 12/2010
(Continued)

OTHER PUBLICATIONS

International Search Report and Written Opinion of the International Searching Authority issued by the U.S. Patent and Trademark Office for International Application No. PCT/US2021/015649 dated Apr. 12, 2021. (8 pages).

(Continued)

Primary Examiner — David J Parsley
(74) Attorney, Agent, or Firm — Haynes and Boone, LLP; Randall C. Brown; Michael J. Tobin

(57) ABSTRACT

A food processing system includes at least one receptacle containing a composition of water and insoluble solids, a centripetal force-based solid/liquid separator having an inlet, a solids outlet, and a liquid outlet, and a pump able to direct the composition from the receptacle to the inlet of the separator. The separator is configured to separate the composition into a solids stream including the insoluble solids and a liquid stream including water and to direct the solids stream through the solids outlet and the liquid stream through the liquid outlet.

6 Claims, 3 Drawing Sheets

Related U.S. Application Data

(60) Provisional application No. 62/967,793, filed on Jan. 30, 2020.

(51) Int. Cl.
*A22C 21/00* (2006.01)
*A22C 21/04* (2006.01)
*B01D 17/02* (2006.01)
*B01D 21/26* (2006.01)
*C02F 11/127* (2019.01)
*C02F 103/22* (2006.01)

(52) U.S. Cl.
CPC .......... *A22C 21/04* (2013.01); *B01D 17/0208* (2013.01); *B01D 21/262* (2013.01); *C02F 11/127* (2013.01); *C02F 2103/22* (2013.01)

(58) Field of Classification Search
CPC . B01D 17/0208; B01D 21/262; C02F 11/127; C02F 2103/22
USPC .................................... 452/74, 123
See application file for complete search history.

(56) References Cited

U.S. PATENT DOCUMENTS

| | | | |
|---|---|---|---|
| 6,142,861 A * | 11/2000 | Buhot | A22B 5/08 452/78 |
| 6,395,181 B1 | 5/2002 | Mullerheim | |
| 6,802,984 B1 | 10/2004 | Perkins et al. | |
| 6,986,910 B2 | 1/2006 | Howarth | |
| 7,963,828 B2 | 6/2011 | Roth et al. | |
| 2003/0205514 A1 | 11/2003 | Potter et al. | |
| 2007/0141973 A1 | 6/2007 | Howarth | |
| 2008/0076619 A1 | 3/2008 | Scott et al. | |
| 2010/0317271 A1 | 12/2010 | Roth et al. | |
| 2011/0027437 A1 | 2/2011 | Liimatta | |
| 2015/0313247 A1 | 11/2015 | Nicholson | |
| 2018/0370809 A1 | 12/2018 | Lee et al. | |
| 2019/0194081 A1 | 6/2019 | Bhalla et al. | |

FOREIGN PATENT DOCUMENTS

| | | |
|---|---|---|
| CN | 105347443 A | 2/2016 |
| CN | 107082528 A | 8/2017 |
| CN | 108675519 A | 10/2018 |
| CN | 208471704 U | 2/2019 |
| CN | 110698030 A | 1/2020 |
| CO | NC2024/0005392 | 5/2024 |
| GB | 2509137 A | 6/2014 |
| IL | 261837 A | 1/2019 |
| WO | WO 2017/112605 A1 | 6/2017 |
| WO | WO 2019/035999 A1 | 2/2019 |
| WO | WO 2020/058971 A1 | 3/2020 |

OTHER PUBLICATIONS

First Examination Report for Saudi Arabian Patent Application No. 522433433, prepared by Saudi Authority for Intellectual Property, dated Jul. 25, 2023, (14 pgs.).

First Examiner's Requisition for Canadian Patent Application No. 3,166,154, prepared by the Canadian Patent Office, dated Oct. 5, 2023, (3 pgs.).

Office Action for Colombian Patent Application No. NC2022/0010385 prepared by the Colombian Patent and Trademark Office dated Jan. 9, 2025. (9 pgs.).

Second Examination Report for Saudi Arabian Patent Application No. 522433433 prepared by Saudi Authority for Intellectual Property dated Feb. 5, 2024. (10 pgs.).

Second Office Action for Colombian Patent Application No. NC2022/0010385 prepared by the Colombian Patent and Trademark Office dated May 19, 2025. (11 pgs.).

* cited by examiner

REMOVAL OF INSOLUBLES FROM AQUEOUS STREAMS USED IN FOOD PROCESSING

CROSS-REFERENCE TO RELATED APPLICATIONS

The present application is a divisional of U.S. Nonprovisional patent application Ser. No. 17/759,477 filed Jul. 26, 2022, titled "REMOVAL OF INSOLUBLES FROM AQUEOUS STREAMS USED IN FOOD PROCESSING," which is a U.S. National Stage patent application of International Patent Application No. PCT/US2021/015649 filed Jan. 29, 2021, titled "REMOVAL OF INSOLUBLES FROM AQUEOUS STREAMS USED IN FOOD PROCESSING," which claims benefit of U.S. Provisional Patent Application No. 62/967,793 filed Jan. 30, 2020, titled "Removal of Insolubles from Aqueous Streams used in Poultry Processing," the disclosures of which are incorporated herein by reference in their entirety.

TECHNICAL FIELD

The present application relates to removal of insoluble materials from aqueous streams used in food processing. More particularly, the application relates to removal of insoluble materials from aqueous streams used in poultry processing using a centripetal force-based solid/liquid separator.

BACKGROUND OF THE DISCLOSURE

Poultry processing establishments transform a live animal to a whole bird or individual parts for consumption by the general population. The process of this transformation requires multiple unit operations that involve large volumes of water. During the various processing steps, the water streams become contaminated with solids such as feathers, ingesta, and fecal matter as well as insoluble liquids such as lipids.

In order to ensure a safer food supply for the general population, the United States Department of Agriculture (USDA) has established microbial performance standards for these establishments. Antimicrobial interventions are used at the various unit operations to aid in microbial reduction, allowing the establishments to achieve the performance standards. However, the presence of solid and liquid contaminants from the process can also interact with the antimicrobials, especially oxidizers such as peracetic acid (PAA), rendering the antimicrobials less effective. In addition, the solids, such as feathers and fecal matter, contain bacteria that can increase the microbial load that will need to be treated downstream. Solids, such as ingesta, and liquids, such as insoluble fat, can serve as food sources for microbes. These issues can increase the difficulty for establishments to achieve the USDA microbial performance standards. A need remains for a unit operation to remove solids and insoluble liquids from the aqueous processing streams in order to diminish the challenge of reducing the microbial load.

DETAILED DESCRIPTION

Embodiments of the present disclosure relate to removal of insoluble materials from aqueous streams used in food processing. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In a typical poultry processing plant, scalder systems are used to open the feather follicle pores of poultry workpieces prior to feather removal. A typical scalder system includes one or more scalder tanks filled with water that has been heated to a temperature of generally about 125 to about 135° F. During the scalding process, feed and fecal material become dislodged in the heated scalder water. As the feed and fecal matter is dense, the majority of the matter will sink to the bottom of the scalder tank and, in conventional processes, accumulate over the processing day which is typically a period of about sixteen hours. The feed and fecal matter may, and usually does, contain a microbial load. The temperature of the scalder system is also conducive to microbial growth of the contaminants that enter the system with the harvested birds. In conventional scalding processes, during the sixteen-hour processing day, solid contaminants build-up in volume and microbial growth takes place; the solids are eventually removed at the end of the processing day by draining the water and manually shoveling out the solids. In such processes, maintaining a low microbial load is difficult due to the presence of solids (such as feathers, fecal matter, and ingesta) and insoluble liquids (such as insoluble fats) in the aqueous processing streams.

Figure 1:
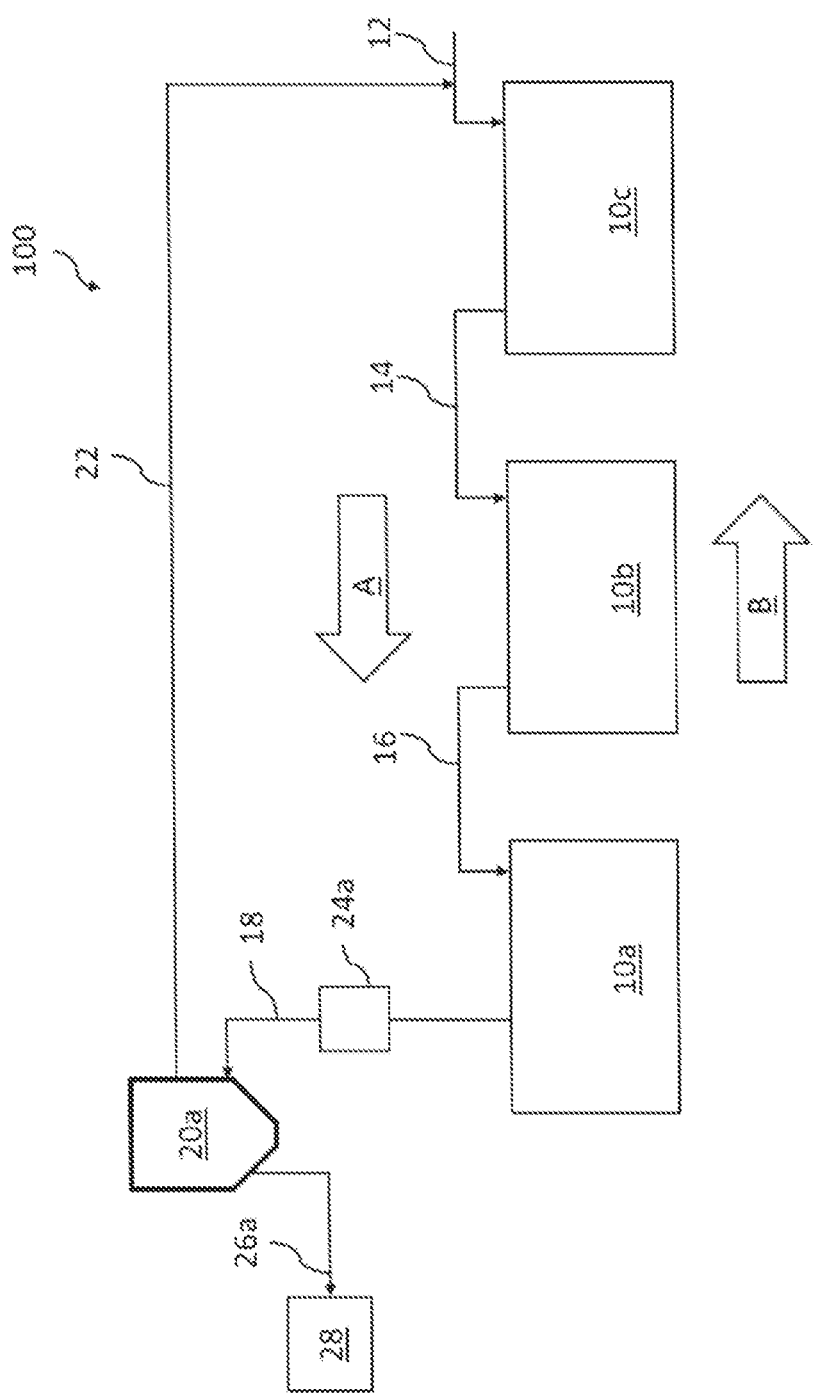
FIG. 1 is a schematic diagram of a food processing system according to an embodiment of the present disclosure.

Referring to FIG. 1, a scalder system 100 according to an embodiment of the present disclosure is capable of removing solids from aqueous streams in order to avoid the unwanted effects detailed above. In operation of the scalder system 100, recently harvested poultry workpieces, contaminated with feed and fecal matter, are placed on a shackle line (not shown) and travel in the direction of arrow B through the scalder system 100. The poultry workpieces enter the first scalder tank 10a and traverse through the second scalder tank 10b and third scalder tank 10c before exiting the scalder system. Water is added to the scalder system in a counter-current method, as indicated by arrow A. The water may be maintained at a temperature of, for example, 100 to 150° F., 110 to 140° F., or 125 to 135° F. The water enters the third scalder tank 10c as shown by line 12 and overflows into the second scalder tank 10b as shown by line 14. Scalder water in the second scalder tank 10b overflows into the first scalder tank 10a as shown by line 16. Although three scalder tanks 10a, 10b, 10c are shown in FIG. 1, the scalder system 100 according to the present disclosure may have one or more scalder tanks.

A pump 24a directs scalder water from the first scalder tank 10a to a centripetal force-based solid/liquid separator ("SL separator") 20a via line 18. In one or more embodiments, a portion of the scalder water in the first scalder tank 10a overflows and exits to a waste treatment system (not shown). The pump 24a is appropriately sized to deliver a raw feed stream to a stationary conical-shaped housing of the SL separator 20a. The raw feed stream is an aqueous stream containing insolubles (solids and/or liquids). The SL separator 20*a* uses centripetal force to cause heavier-than-water solids within the raw feed stream to drop to the bottom of the conical-shaped housing while the liquid, free of heavier-than-water solids, ("solids-free water") exits the top of the SL separator 20*a* via line 22. The solids-free water may be either 1) returned to one of the scalder tanks 10*a*, 10*b*, 10*c* or 2) transferred to a liquid/liquid decanter, as described in more detail below. A small liquid stream containing solids is discharged from the bottom of the SL separator 20*a* via line 26*a* and directed to a waste collection site 28.

According to one or more embodiments, the SL separator 20*a* has no moving parts, thereby reducing maintenance costs. In such embodiments, the pump 24*a* supplies the proper velocity to obtain the centripetal force needed to separate the solids from the liquid.

Specifications for the SL separator 20*a* (such as height and width) and pump 24*a* are designed based on the specific inputs (e.g., water usage, bird size of each plant, % solids, and % insoluble liquid) to produce a continuous operating system. For example, in an embodiment, the pump 24*a* is a 5 HP centrifugal pump capable of pumping at 50-100 gallons/min (gpm), and the pump 24*a* delivers liquid from the first scalder tank 10*a* into the SL separator 20*a* at a pressure of 25-50 psig through line 18, which is 1-2" in diameter. In said embodiment, the SL separator 20*a* has a 4-6" diameter conical body with a height of 12-25", the discharge line 22 has a diameter of 1-2", and the discharge line 26*a* has a diameter of 0.5-1".

According to one or more embodiments, a volume of make-up water may also be added to the third scalder tank 10*c* via line 12 in order to maintain a constant water volume in the scalder system 100. In some embodiments, the ratio of the discharge streams from the SL separator 20*a* through line 26*a* and line 22 is 50:50, 30:70, 25:70, 20:80, or 5:95.

The scalder system 100 according to FIG. 1 is capable of removing up to 90% of the dislodged solids from the first scalder tank 10*a*, thereby reducing the probability of microbial growth and contamination in the first scalder tank 10*a*. Removal of the solids also reduces the amount of labor required to shovel out solids at the end of a sixteen-hour processing day. Although FIG. 1 depicts the SL separator 20*a* as being in communication with the first scalder tank 10*a*, the system 100 is not so limited and the SL separator 20*a* may be in communication with any scalder tank. However, in general, the first scalder tank 10*a* contains the largest amount of insoluble solids and liquids. In any embodiment, a plurality of SL separators 20*a* may be employed and each SL separator 20*a* may include one or more pumps 24*a*, as needed to provide appropriate hydraulic volume, flow, and pressure requirements.

Figure 2:
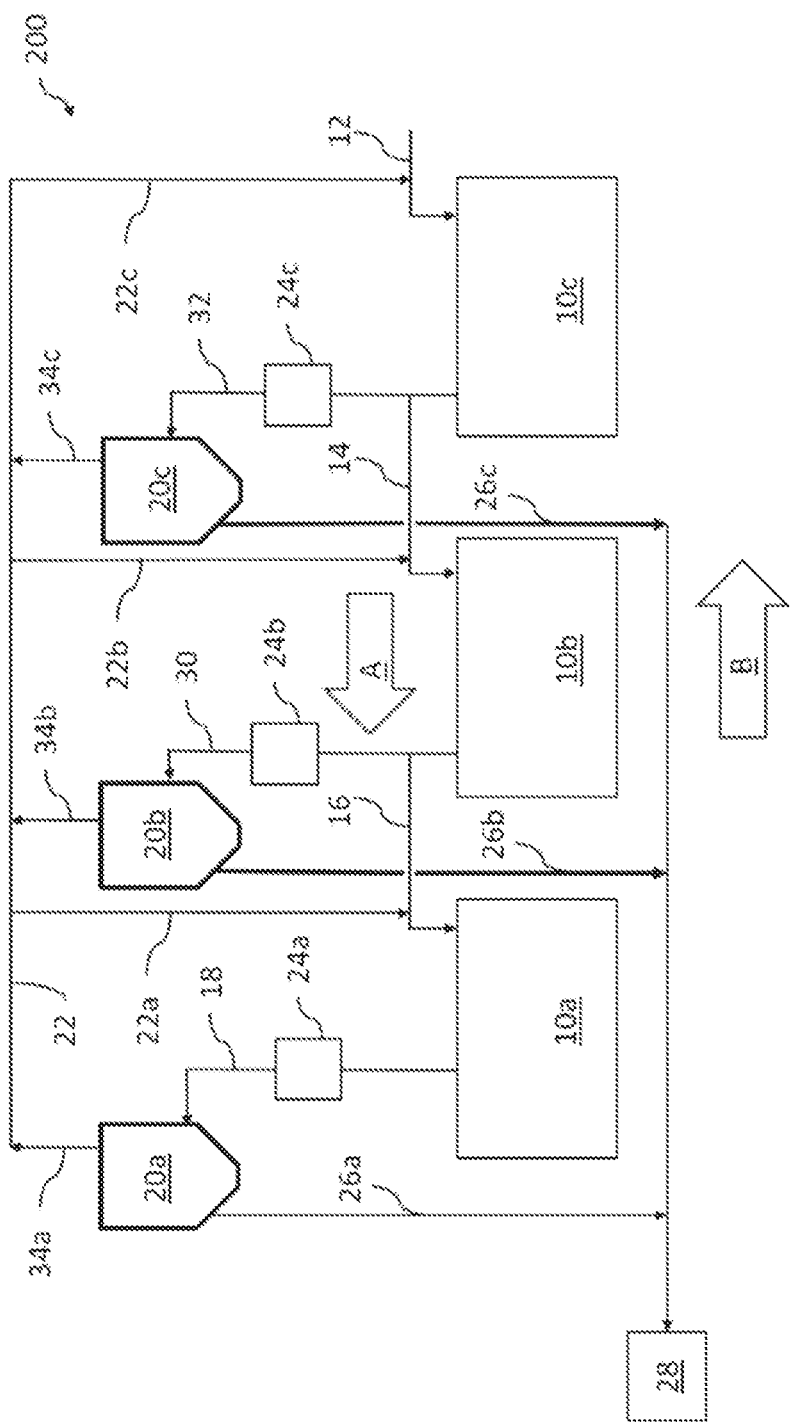
FIG. 2 is a schematic diagram of a food processing system according to an embodiment of the present disclosure.

Turning to FIG. 2, an alternative scalder system 200 is illustrated. In the scalder system 200, a plurality of SL separator 20*a*, 20*b*, 20*c* are employed, each of which being associated with a single scalder tank 10*a*, 10*b*, 10*c*, respectively. A pump 24*c* directs scalder water from the third scalder tank 10*c* via line 32 to SL separator 20*c*. A solids-containing stream exits SL separator 20*c* via line 26*c* and a solids-free stream exits via line 34*c*. A pump 24*b* directs scalder water from the second scalder tank 10*b* via line 30 to SL separator 20*b*. A solids-containing stream exits SL separator 20*b* via line 26*b* and a solids-free stream exits via line 34*b*. As in system 100, a pump 24*a* directs scalder water from the first scalder tank 10*a* via line 18 to SL separator 20*a*. A solids-containing stream exits SL separator 20*a* via line 26*a* and a solids-free stream exits via line 34*a*. Each of the pumps 24*a*, 24*b*, 24*c* may the same or different. For example, in view of the generally decreasing amount of insolubles as the poultry workpieces move through the scalder system 200, pump 24*a* may be configured to pump a larger amount of liquid than pump 24*b* and pump 24*b* may be configured to pump a larger amount of liquid than pump 24*c*. Each of the SL separators 20*a*, 20*b*, 20*c* may be the same or different. For instance, the SL separator 20*a* may be configured to process a larger volume than SL separator 20*b* and SL separator 20*b* may be configured to process a larger volume than SL separator 20*c*.

According to one or more embodiments, a volume of make-up water may also be added to the third scalder tank 10*c* via line 12 in order to maintain a constant water volume in the scalder system 200. In some embodiments, the ratio of the discharge streams from each SL separator 20*a*, 20*b*, 20*c* through lines 26*a*, 26*b*, 26*c* and lines 34*a*, 34*b*, 34*c* is 50:50, 30:70, 25:70, 20:80, or 5:95.

As shown in FIG. 2, solids-free water from SL separator 20*a* may be directed through a common header 22 into any of the first, second, or third scalder tanks 10*a*, 10*b*, 10*c* via lines 22*a*, 22*b*, 22*c*, respectively. Similarly, solids-free water from SL separator 20*b* may be directed through a common header 22 into either of the second or third scalder tanks 10*b*, 10*c* via lines 22*b*, 22*c*, respectively. In some embodiments, all of the solids-free water from SL separators 20*a*, 20*b*, 20*c* is directed to the third scalder tank 10*c*. In any embodiment, a volume of makeup water may be supplied to any of the scalder tanks 10*a*, 10*b*, 10*c* to maintain a constant volume.

Specifications for the SL separators 20*a*, 20*b*, 20*c* (such as height and width) and pumps 24*a*, 24*b*, 24*c* are designed based on the specific inputs (e.g., water usage, bird size of each plant, % solids, and % insoluble liquid) to produce a continuous operating system. For example, in an embodiment, each pump 24*a*, 24*b*, 24*c* is a 5 HP centrifugal pump capable of pumping at 50-100 gpm, and each pump 24*a*, 24*b*, 24*c* delivers liquid from the respective scalder tank 10*a*, 10*b*, 10*c* into the respective SL separators 20*a*, 20*b*, 20*c* at a pressure of 25-50 psig through line 18, 30, 32 having a 1-2" diameter. In this embodiment, each SL separator 20*a*, 20*b*, 20*c* has a 4-6" diameter conical body with a height of 12-25", the discharge lines 34*a*, 34*b*, 34*c* each have a diameter of 1-2", and the discharge lines 26*a*, 26*b*, 26*c* each have a diameter of 0.5-1".

In any embodiment, the scalder system 200 may include any number of scalder tanks (e.g., 1, 2, 3, 4, 5, or 6 or more) and each scalder tank may have 0, 1, 2, or 3 or more SL separators in fluid communication therewith, as needed to provide adequate removal of insolubles. In any embodiment, each SL separator may include one or more pumps, as needed to provide appropriate hydraulic volume, flow, and pressure requirements.

The scalder system 200 according to FIG. 2 is capable of removing up to 90% of the dislodged solids from each scalder tank 10*a*, 10*b*, 10*c* thereby reducing the probability of microbial growth and contamination in the scalder tanks 10*a*, 10*b*, 10*c*. Removal of the solids also reduces the amount of labor required to shovel out solids at the end of a sixteen-hour processing day.

Figure 3:
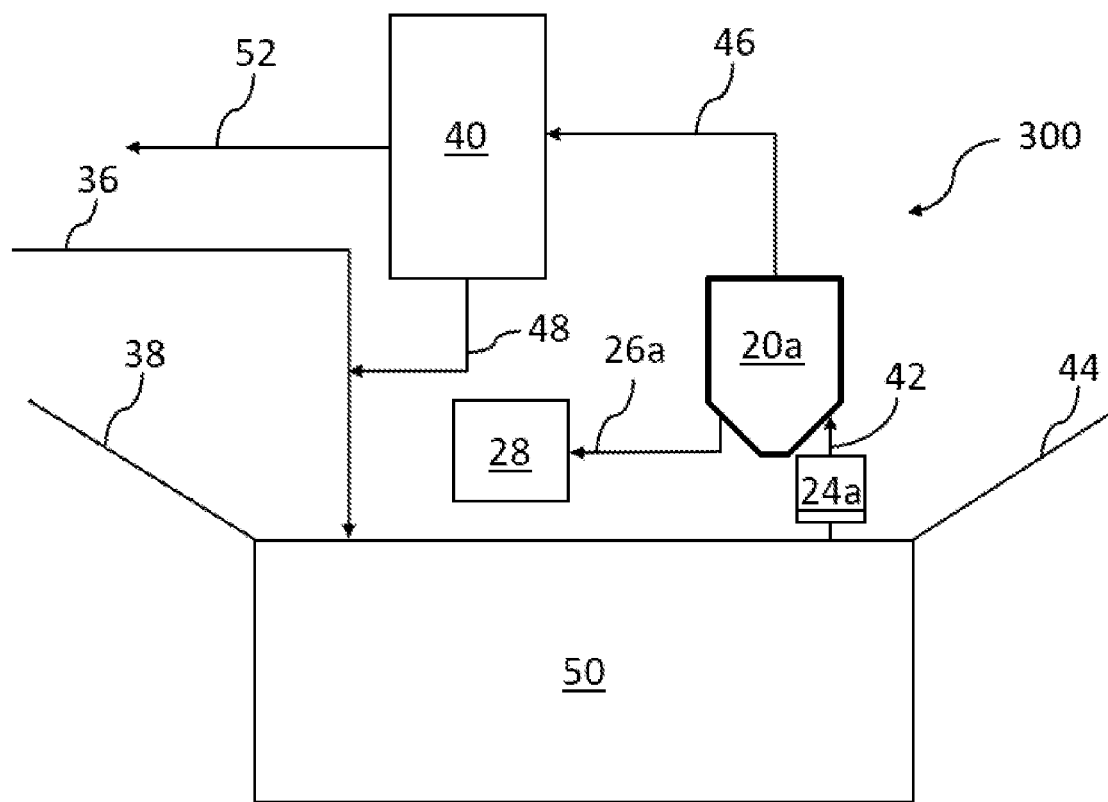
FIG. 3 is a schematic diagram of a food processing system according to an embodiment of the present disclosure.

In some embodiments, any of the SL separators 20*a*, 20*b*, 20*c* can be used in conjunction with a liquid/liquid decanter ("LL decanter") 40, an example of which is shown in FIG. 3, to remove lighter-than-water insoluble liquid and solids from the aqueous stream. The LL decanter 40 is a tank or widened pipe that collects and retains a feed stream containing two immiscible liquids. According to embodiments of the present disclosure, the feed stream may be scalder water from a scalder tank (10*a*, 10*b*, 10*c*) or the solids-free water from a SL separator (20*a*, 20*b*, 20*c*). The feed stream enters the LL decanter and is retained for a pre-determined period of time (i.e., a resonance time). During the resonance time, the insoluble liquids of the feed stream separate, with the less dense liquid rising to the top of the LL decanter while the denser liquid sinks to the bottom. The liquids are removed at their respective locations via piping for discharge to collection vessels or recycling back to the process. In particular, the lighter-than-water insoluble liquid (and lighter-than-water solids) rises to the top of the LL decanter 40 and is removed at a steady rate via line 52 to a collection center. The lower water exits the LL decanter 40 at the bottom and returns via line 48 to the application point (e.g., a scalder tank or chiller (described below)). In one or more embodiments, the LL decanter 40 may include a manual discharge valve on line 48 that may be throttled to control the volume in LL decanter 40 and the location of the interface between the two liquid phases within the LL decanter 40. According to one or more embodiments, a volume ratio of the streams through line 52 and line 48 may be 50:50, 30:70, 25:70, 20:80, or 5:95.

The LL decanter 40 may be used in any embodiment disclosed herein. In some embodiments, a plurality of LL decanters 40 may be employed. For example, each SL separator 20*a*, 20*b*, 20*c* may be paired with one or more LL decanter 40 or a single LL decanter 40 may be coupled to a plurality of SL separators 20*a*, 20*b*, 20*c*.

Turning again to FIG. 3, also described herein is a chiller system 300 used to cool processed poultry workpieces to below 40° F. The chiller system 300 includes a chiller unit 50 having up to three chiller tanks filled with cooled water, supplied at least in part by line 36. In one or more embodiments, the chiller unit 50 includes three tanks, wherein the temperature of the water in the first tank is 55-60° F., the temperature of the water in the second tank is 40-55° F., and the temperature of the water in the third tank is less than 40° F. In another embodiment, the chiller unit 50 includes a single tank filled with water at a temperature of less than 40° F. or a single tank having a temperature gradient along its length such than one end has a water temperature of less than 40° F. The chiller unit 50 includes, in each tank, an agitation system well known to those of ordinary skill in the art, such as a rocking arm or a screw-shaft mechanism. In some embodiments, compressed air is also pumped into the bottom of the tanks of the chiller unit 50 as an agitation source.

According to one or more embodiments, poultry workpieces enter the chiller unit 50 via a ramp 38. The combination of the agitation systems transfers poultry workpieces, along with carry-over water, through each tank of the chiller unit 50. The chilled poultry workpieces then exit at a discharge 44. In embodiments where the chiller unit 50 includes three tanks, the resonance time in each tank may be, for example, 60-90 minutes. In such embodiments, as the water level in the third tank increases, the water is transferred back to the second tank and/or the first tank. In any embodiment, as needed, make-up water may be added to the chiller unit in any of the tanks.

As the processed poultry workpieces enter the chiller system 300, certain material can become dislodged from the carcasses. The material may include viscera, entrails, skin, fats, and digesta. Most of the material is dislodged and accumulates near a front end of the chiller unit 50 (e.g., in the first tank). As the organic load in the chiller unit 50 increases from the dislodged material, operational issues can occur such as foaming and decreased antimicrobial efficacy.

In order to avoid accumulation of the organic load in the chiller unit 50, the chiller system 300 of the present disclosure employs SL separator 20*a* and, optionally, LL decanter 40 to remove insolubles from the aqueous stream. The SL separator 20*a* and LL decanter 40 are described in detail above. As shown in FIG. 3, pump 24*a* directs liquid from the chiller unit 50 to the SL separator 20*a* via line 42. The pump 24*a* is described in detail above. The SL separator 20*a* uses centripetal force to cause heavier-than-water solids within the raw feed stream to drop to the bottom of the conical-shaped housing while the liquid, free of heavier-than-water solids, ("solids-free water") exits the top of the SL separator 20*a* via line 46. The solids-free water may be either 1) returned to the chiller unit 50 (not shown in FIG. 3) or 2) transferred to the LL decanter 40. A small liquid stream containing solids is discharged from the bottom of the SL separator 20*a* via line 26*a* and directed to a waste collection site 28.

Although the above embodiments have been directed to processing poultry workpieces, the systems and methods described herein may be applied to other food products, such as beef, pork, fruits and vegetables. Additionally, the SL separator and, optionally, the LL decanter described herein may be used in any food processing operation wherein separation of insolubles from an aqueous stream is required.

A system for processing food has been disclosed herein. The food processing system, comprises: at least one receptacle containing a composition comprising water and insoluble solids; a centripetal force-based solid/liquid separator comprising an inlet, a solids outlet, and a liquid outlet; and a pump configured to direct the composition from the receptacle to the inlet of the separator; wherein the separator is configured to separate the composition into a solids stream comprising the insoluble solids and a liquid stream comprising water and to direct the solids stream through the solids outlet and the liquid stream through the liquid outlet.

The system may include any of the following features:
  the insoluble solids comprise poultry feed, fecal matter, viscera, entrails, skin, fats, and/or digesta;
  the pump is a centrifugal pump configured to direct the composition into the inlet of the separator at sufficient pressure to induce centrifugal separation of the solid stream and the liquid stream;
  the receptacle is a scalder tank and the composition is at a temperature of 100 to 150° F.;
  a second scalder tank containing a second composition comprising water and insoluble solids; a second centripetal force-based solid/liquid separator comprising an inlet, a solids outlet, and a liquid outlet; and a second pump configured to direct the composition from the receptacle to the inlet of the second separator; wherein the second separator is configured to separate the composition into a solids stream comprising the insoluble solids and a liquid stream comprising water and to direct the solids stream through the solids outlet and the liquid stream through the liquid outlet;
  a liquid/liquid decanter coupled to the liquid outlet of the separator; wherein the composition further comprises insoluble liquids; and wherein the decanter is configured to separate the liquid stream from the separator into a water stream and an insoluble liquid stream;
  the decanter is in fluid communication with the scalder tank and configured to direct the water stream to the scalder tank;
  the liquid outlet of the separator is in fluid communication with the receptacle and configured to direct the liquid stream to the receptacle;
  the receptacle is a chiller tank and wherein the composition is at a temperature of less than 40° F.;

a liquid/liquid decanter coupled to the liquid outlet of the separator; wherein the composition further comprises insoluble liquids; and wherein the decanter is configured to separate the liquid stream from the separator into a water stream and an insoluble liquid stream; and/or the liquid outlet of the separator is in fluid communication with the chiller tank and configured to direct the liquid stream to the chiller tank.

A method of scalding poultry workpieces has been disclosed herein. The method includes: immersing the workpieces in a scalder tank containing water, wherein, during the immersing step, insoluble solids are dislodged from the workpieces and deposited in the scalder tank; using a pump to direct water and the insoluble solids from the scalder to a solid/liquid separator; using the separator to remove the insoluble solids from the water; and recycling the water from the separator.

The method may include any of the following features:
the pump is a centrifugal pump configured to direct the water and insoluble solids into the separator at sufficient pressure and speed to induce centrifugal separation of the insoluble solids and the water;

wherein during the immersing step, insoluble liquids from the workpieces are deposited into the scalder tank; wherein the water leaving the separator contains the insoluble liquids; the method further comprising: directing the water from the separator to a liquid/liquid decanter; separating the insoluble liquids from the water; and returning the water from the decanter to the scalder tank;

immersing the workpieces in a second scalder tank; and overfilling the second scalder tank with fresh water such that it overflows into the first scalder tank.

A method of chilling poultry workpieces has been disclosed herein. The method comprises: immersing the workpieces in a chiller tank containing water at a temperature of less than 40° F., wherein immersing the workpieces dislodges insoluble solids that are deposited in the chiller tank; using a pump, directing the water and insoluble solids from the chiller tank to a separator; using the separator, separating the insoluble solids from the water; disposing of the insoluble solids; and recycling the water.

The method may include any of the following features:
wherein the pump is a centrifugal pump capable of pumping at 50-100 gallons/min; and wherein directing the water and insoluble solids comprises pumping the water and insoluble solids into the separator at a pressure of 25-50 psig;

wherein the separator is a stationary conical-shaped housing;

directing the water from the separator to a decanter, wherein the water comprises insoluble liquids; separating the water and the insoluble liquids; and returning the water to the chiller tank;

supplying fresh water to the chiller tank to maintain a constant volume within the chiller tank.

The above specific example embodiments are not intended to limit the scope of the claims. The example embodiments may be modified by including, excluding, or combining one or more features or functions described in the disclosure. The description of the present disclosure has been presented for purposes of illustration and description but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A method of scalding poultry workpieces, comprising immersing the workpieces in a first scalder tank containing water, wherein, during the immersing step, insoluble solids are dislodged from the workpieces and deposited in the scalder tank to create an aqueous composition comprising the water, the insoluble solids and insoluble liquids;

using a centrifugal pump to direct the aqueous composition from the first scalder tank to an inlet of a centripetal force-based solid/liquid separator at a sufficient pressure and velocity to induce centrifugal separation of heavier-than-water insoluble solids from the aqueous composition in the separator;

using the separator to separate the heavier-than-water insoluble solids from the aqueous composition to create a solids stream comprising the heavier-than-water insoluble solids and a liquid stream comprising the water, the insoluble liquids and lighter-than-water insoluble solids, wherein the solids stream is directed through a solids outlet of the separator and the liquid stream is directed through a liquid outlet of the separator to a liquid/liquid decanter;

using the liquid/liquid decanter to separate the insoluble liquids and the lighter-than-water insoluble solids from the water; and returning the water from the liquid/liquid decanter to the first scalder tank.

2. The method of claim 1, further comprising:
immersing the workpieces in a second scalder tank; and overfilling the second scalder tank with fresh water such that it overflows into the first scalder tank.

3. The method of claim 1, wherein the water in the scalder tank is heated to a temperature of from 100 to 150° F.

4. The method of claim 1, wherein the water in the scalder tank is heated to a temperature of from 110 to 140° F.

5. The method of claim 1, wherein the water in the scalder tank is heated to a temperature of from 125 to 135° F.

6. The method of claim 1, wherein the centrifugal pump directs the water and insoluble solids from the scalder to the separator at a velocity of from 50 to 100 gallons per minute and at a pressure of from 25 to 50 psig.

* * * * *